(12) United States Patent
Peters

(10) Patent No.: US 7,721,550 B2
(45) Date of Patent: May 25, 2010

(54) AIRCRAFT ENGINE EXHAUST FLAP CURVED STRUT SLOT

(75) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 732 days.

(21) Appl. No.: 11/200,895

(22) Filed: Aug. 10, 2005

(65) Prior Publication Data

US 2007/0033921 A1 Feb. 15, 2007

(51) Int. Cl.
*F02K 1/00* (2006.01)

(52) U.S. Cl. ..................... 60/771; 239/265.19

(58) Field of Classification Search ............. 60/771, 60/770, 228, 230, 232; 239/265.19, 265.39
See application file for complete search history.

(56) References Cited

U.S. PATENT DOCUMENTS

| | | | | |
|---|---|---|---|---|
| 3,024,600 A | * | 3/1962 | Sollinger | 239/265.39 |
| 3,558,058 A | * | 1/1971 | Lennard et al. | 239/265.29 |
| 5,201,800 A | * | 4/1993 | Wolf | 60/204 |
| 5,221,048 A | | 6/1993 | Lair | |
| 5,359,851 A | | 11/1994 | Bannerot | |
| 5,813,609 A | * | 9/1998 | Ellerhorst | 239/127.3 |
| 7,225,622 B2 | * | 6/2007 | Petty et al. | 60/771 |

FOREIGN PATENT DOCUMENTS

| | | | |
|---|---|---|---|
| GB | 2404222 | * | 1/2005 |
| JP | 52140200 | | 11/1977 |
| JP | 63253160 | | 10/1988 |
| JP | 4504604 | | 8/1992 |
| JP | 11182344 | | 7/1999 |

* cited by examiner

*Primary Examiner*—Michael Cuff
*Assistant Examiner*—Andrew Nguyen
(74) *Attorney, Agent, or Firm*—Carlson, Gaskey & Olds PC

(57) ABSTRACT

An aircraft engine nozzle assembly includes an adjustable flap portion that is movable about a pivot for changing the size of an exhaust exit area. A bracket having a curved slot establishes a range of possible movement of the flap portion. A link includes a guide member portion that is received in the curved slot for guiding the movement of the flap portion. The link is connected to a static engine structure and the bracket is movable with the flap portion. The curved slot establishes a range of possible movement of the flap portion along a direction of the curved slot.

22 Claims, 3 Drawing Sheets

AIRCRAFT ENGINE EXHAUST FLAP CURVED STRUT SLOT

This invention was made with government support under Contract No. N00019-02-C-3003 awarded by the Department of the Navy. The government therefore has certain rights in this invention.

BACKGROUND OF THE INVENTION

This invention relates to aircraft engine exhaust nozzles and, more particularly, to a linkage having a curved guide portion for adjusting the position of an exhaust nozzle to change the size of an exhaust flow area.

Conventional aircraft engines, such as turbojet engines, typically include a compressor, a combustor and a turbine. Compressed air mixed with fuel in the combustor generates a flow of hot gases. The hot gases flow through the turbine and expand against a plurality of turbine blades. The turbine blades transform the expansion of hot gases into mechanical energy for driving a rotor shaft that in turn drives the compressor. The hot gases exit the engine through an exhaust nozzle to provide thrust to the aircraft.

Conventional exhaust nozzles are adjustable such that the size of the area through which the hot gases flow changes with changing exhaust flow pressure. The size of the exhaust area is proportional to the thrust that the engine produces. During take-off for example, more thrust is desired than during cruising and therefore a larger exhaust area is desirable. Further, the amount of thrust that the engine produces is related to the amount of fuel that the engine combusts. As a result, adjusting the size of the nozzle for take-off and cruising conditions to provide a desired amount of thrust can increase fuel efficiency.

Conventional exhaust nozzle assemblies include a plurality of adjustable flaps that move in response to changing exhaust flow pressures. To maintain stable movement of the flap, the flap typically includes a slot to guide the flap as it moves. A strut having one end fixed to the engine and another end received in the slot allows flap movement along the slot and prevents significant movement in other directions to stabilize the flap. Conventional slots are linear and the strut is received into the slot at an angle to the linear direction.

One disadvantage of conventional exhaust nozzle assemblies lies in the linear shape of the slot. Relative movement between the strut and the slot is conducive to frictional binding, which may result in flap lock-up. In particular, when the strut forms an angle near 90° with the slot, frictional binding may occur. Further, frictional binding may increase when changing a direction of flap movement. Thus, the frictional binding may limit the range of movement of the flap and therefore limit the benefits to the aircraft engine.

Accordingly, there is a need for an exhaust nozzle assembly that allows a greater range of flap movement while minimizing frictional binding. This invention addresses these needs and provides enhanced capabilities while avoiding the shortcomings and drawbacks of the prior art.

SUMMARY OF THE INVENTION

This invention is an engine nozzle assembly, including an adjustable flap guided within a curved slot.

An exemplary aircraft engine nozzle assembly according to the present invention includes an adjustable flap portion that is movable about a pivot for changing the size of an exhaust exit area. A bracket having a curved slot establishes a range of possible movement of the flap portion to control the exhaust exit area. A link includes a guide member portion that is received in the curved slot and that is movable along the curved slot.

An exemplary method according to this invention includes adjusting a size of an exhaust exit area of an aircraft engine nozzle assembly. The method includes the step of moving an adjustable flap portion having a slider that is connected to a link received within a curved slot portion. The slider is moved along the curved slot portion to establish a range of possible movement of the flap portion.

Accordingly, the engine nozzle assembly of this invention provides a greater range of motion for flaps to improve performance of an aircraft engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
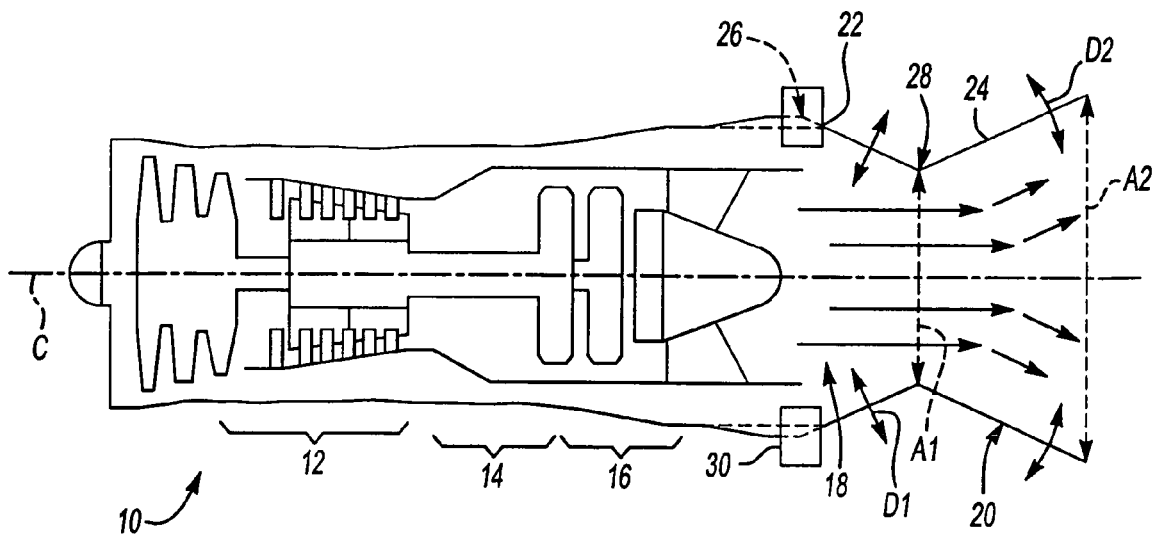
FIG. 1 is a schematic view of a turbine engine assembly.

FIG. 1 illustrates selected portions of a turbine engine assembly 10 that includes a compressor 12, a combustor 14, and a turbine 16. The turbine engine assembly 10 operates in a known manner, feeding compressed air from the compressor 12 to the combustor 14. The compressed air is mixed with fuel and ignited to produce a flow of hot gasses 18. The turbine 16 transforms the flow of hot gasses 18 into mechanical energy to drive a compressor 12. An exhaust nozzle 20 directs the hot gasses 18 out of the engine assembly 10 to provide thrust for an aircraft.

In the illustrated example, the exhaust nozzle 20 includes first flaps 22 and second flaps 24. The first flaps 22 converge toward an engine central axis C and are pivotable along a direction $D_1$ to change the size of a jet area $A_1$. The second flaps 24 diverge from the engine central axis C and are moveable along a direction $D_2$ to change the size of an exit area $A_2$.

The first flaps 22 pivot about a first hinge 26 and the second flaps 24 pivot about a second hinge 28 along the respective directions $D_1$ and $D_2$. Actuators 30 selectively pivot the first flaps 22 toward the engine central axis C to reduce the size of the jet area $A_1$ and outward relative to the engine central axis C to increase the size of the jet area $A_1$. The second flaps 24 move outward relative to the engine central axis C when the exhaust pressure of hot gases 18 is relatively high. Movement of the second flaps 24 outward increases the size of the exit area $A_2$ and movement of the second flaps 24 inward decreases the size of the exit area $A_2$. As is known, the ratio between the size of the exit area $A_2$ and the size of the jet area $A_1$ corresponds to the thrust that the turbine engine assembly 10 produces.

In the illustrated example, the second flaps 24 have a range of possible movement, represented by the ends of the direction arrow $D_2$. The second flaps 24 have a range of possible movement that is greater than previously known ranges, as will be described below. The greater range of motion provides the advantage of a greater range of ratios between the size of the exit area $A_2$ and the size of the jet area $A_1$. The greater range of ratios, in turn, allows greater control over thrust that the turbine engine assembly 10 produces.

Figure 2:
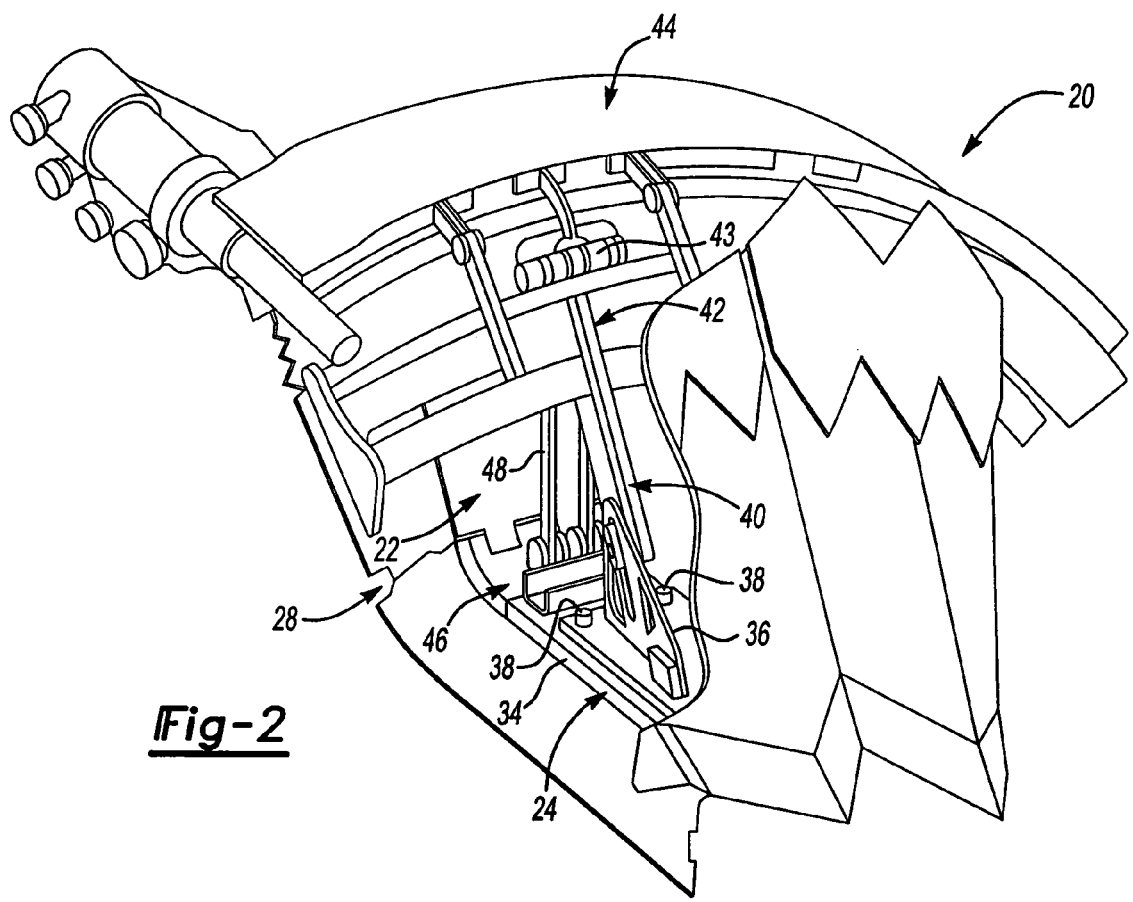
FIG. 2 is a perspective view of selected portions of an exhaust nozzle.

Referring to FIG. 2, the second flap 24 includes a flap portion 34, a bracket 36, and a link 40. The bracket 36 and the flap portion 34 are secured together with fasteners 38. The bracket 36 is coupled to the link 40, which includes an end 42 that is fixed with a ball and socket joint 43 to a static structure 44 of the engine assembly 10.

A forward end 46 of the second flap 24 is coupled at the second hinge 28 to the first flap 22. A drive link 48 is connected near the forward end 46 and is operatively linked to one of the actuators 30 (FIG. 1) for selectively pivoting the first flap 22 to change the jet area $A_1$.

Figure 3:
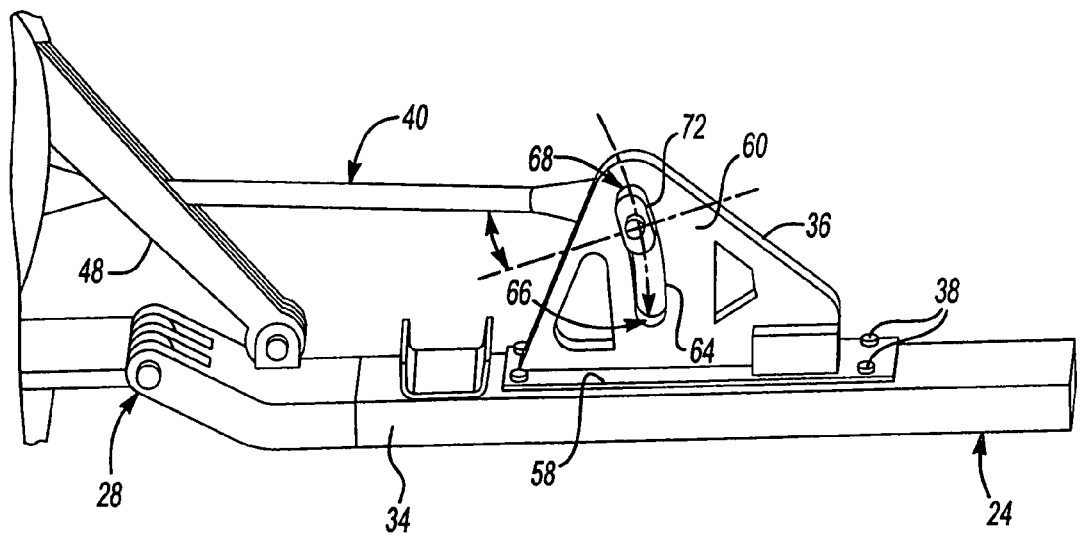
FIG. 3 is a perspective view of a first link having a curved slot.
Figure 4:
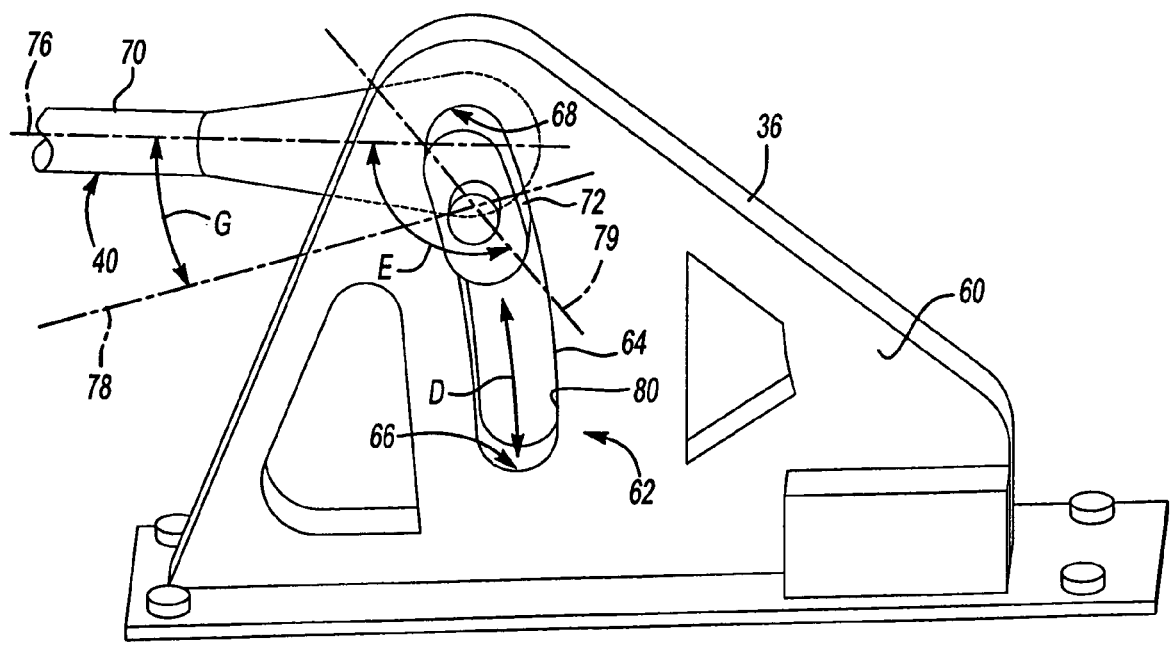
FIG. 4 is a schematic view of the curved slot.

Referring to FIGS. 3 and 4, the bracket 36 includes a bracket portion 58 that is secured to the flap portion 34. In the illustration, the bracket portion 58 is generally shaped to conform to the shape of the flap portion 34. A surface 60 extends from the bracket portion 58. In this example, the surface 60 is substantially perpendicular to the bracket portion 58. The surface 60 includes a curved channel portion 62 having a curved slot 64. The curved slot 64 includes a first end 66 and a second end 68. In this example, the first end 66 is positioned farther back in the engine assembly 10 than the second end 68 and is nearer to the flap portion 34 than the second end 68. That is, the first end 66 is aft of the second end 68.

The link 40 includes a strut 70 having one end fixed to the static structure 44 as described above. A slider 72 is secured to the other end of the strut 70. The slider 72 is received into the curved slot 64 for guiding and stabilizing the second flap 24. During movement of the second flap 24 from changing exhaust pressure, the bracket 36 moves with the second flap 24 relative to strut 70. As the second flap 24 and bracket 36 move, the curved slot 64 and slider 72 move relative to each other along the direction D. The strut 70 and slider 72 allow the second flap 24 to move along the curved slot 64 between the first end 66 and the second end 68. The first end 66 and the second end 68 provide stops that prevent further movement of the slider 72 within the curved slot 64 to establish a range of possible movement of the second flap 24.

In the example shown, the position of the slider 72 moves towards the first end 66 of the slot 64 when the second flap 24 hinges radially outward from the engine central axis C. When the slider 72 is at the first end 66, the first end 66 prevents further movement. This establishes an extreme open position of the second flap 24. The position of the slider 72 moves towards the second end 68 of the curved slot 64 when the second flap 24 hinges radially inward toward the engine central axis C. When the slider 72 is at the second end 68, the second end 68 prevents further movement. This establishes an extreme closed position of the second flap 24. That is, the first end 66 and second end 68 establish a range of possible movement of the second flap 24. For any selected position of the first flap 22, which corresponds to a selected jet area $A_1$, the second flap 24 has a range of possible positions between the first end 66 and the second end 68.

The strut 70 extends along an axis represented by line 76 and forms an angle, G, with the line 78, which is a reference line that is approximately parallel to the second flap 24. The angle G corresponds to the range of the possible movement of the second flap 24. That is, when the second flap 24 hinges radially inward toward the engine central axis C, the angle G decreases and when the second flap 24 hinges radially outward away from the engine central axis C, the angle G increases. It is desirable to maximize the range of the angle G to provide a greater range of movement of the second flap 24. This increases the range of possible ratios between the size of the exit $A_2$ and the size of the jet area $A_1$ for greater control of the thrust that the turbine engine assembly 10 produces.

In one example, the jet area $A_1$ is relatively large such as when the first flaps 22 are outwardly positioned relative to the engine central axis C. In this configuration, when a relatively high exhaust pressure urges the second flap 24 to hinge, the bracket 36 moves such that the position of the slider 72 changes from the illustrated position near the second end 68 to a position near the first end 66.

A force associated with the movement of the slider 72 is split into a first component along a line 79 that is tangent to the direction D of the curved slot 64 and a second component that is perpendicular to the line 79 (i.e., into a wall 80 of the curved slot 64). An engagement angle E between the axis 76 of the strut 70 and the tangent line 79 corresponds to a relative proportion between the first component and second component of the force. Since the tangent line 79 is related to the curvature of the curved slot 64, the relative proportion between the first component and the second component of the force varies non-linearly along the curved slot 64.

As the engagement angle E nears 90°, more of the force of the slider 72 is directed into the wall 80, which produces friction and resists movement of the slider 72. In previously known assemblies, frictional binding occurs when the strut forms an angle near 90° with the linear slot. However, in the illustrated example, the engagement angle E remains above 90° due to the curvature of the curved slot 64. That is, the curvature of the curved slot 64 effectively increases the engagement angle E compared to previously known assemblies. As a result, less of the force is toward the wall 80 and more of the force is in the direction D along the curved slot 64, which allows the slider 72 to move relative to the curved slot 64 without frictionally binding.

The curvature of the curved slot 64 from the first end 66 to the second end 68 increases the engagement angle E such that frictional binding does not occur. This allows the second flap 24 to move closer to the engine central axis C than for the previously known linear slots, without frictional binding. That is, with previously known linear slots, when the corresponding engagement angle is near 90° the corresponding angle G is limited to a minimum of about 5° in order to avoid frictional binding. However, with the curved slot 64, the engagement angle E is effectively increased by the amount of curvature of the curved slot 64, which allows the angle G to be below 5° and therefore provides an increased range of possible movement of the second flap 24 and greater control over the thrust of the engine assembly 10. It is to be understood that the angle G is one example reference from which the range of movement of the second flap can be determined and that, given this description, one of ordinary skill will recognize alternative reference axes or systems.

The magnitude of curvature and length of the curved slot 64 is selected to achieve a desired engagement angle E. In one example, the magnitude of curvature is not too large because when the slider 72 position changes from the first end 66 to the second end 68, the second component of the force into the wall 80 will become too large and result in frictional binding. Given this description, one of ordinary skill in the art will be able to recognize an appropriate magnitude of curvature to meet their particular needs.

In another example, since the bracket 36 is a separate component from the flap portion 34, the type of material used for the bracket 36 can be selected to achieve desired bracket properties. In one example, the flap portion 34 is made of a nickel-based material for high heat resistance and the bracket 36 is made of a titanium-based material for desired mechanical and frictional properties. Given this description, one of ordinary skill in the art will recognize particular slot curvatures, slot lengths, and materials to meet their particular needs.

Figure 5:
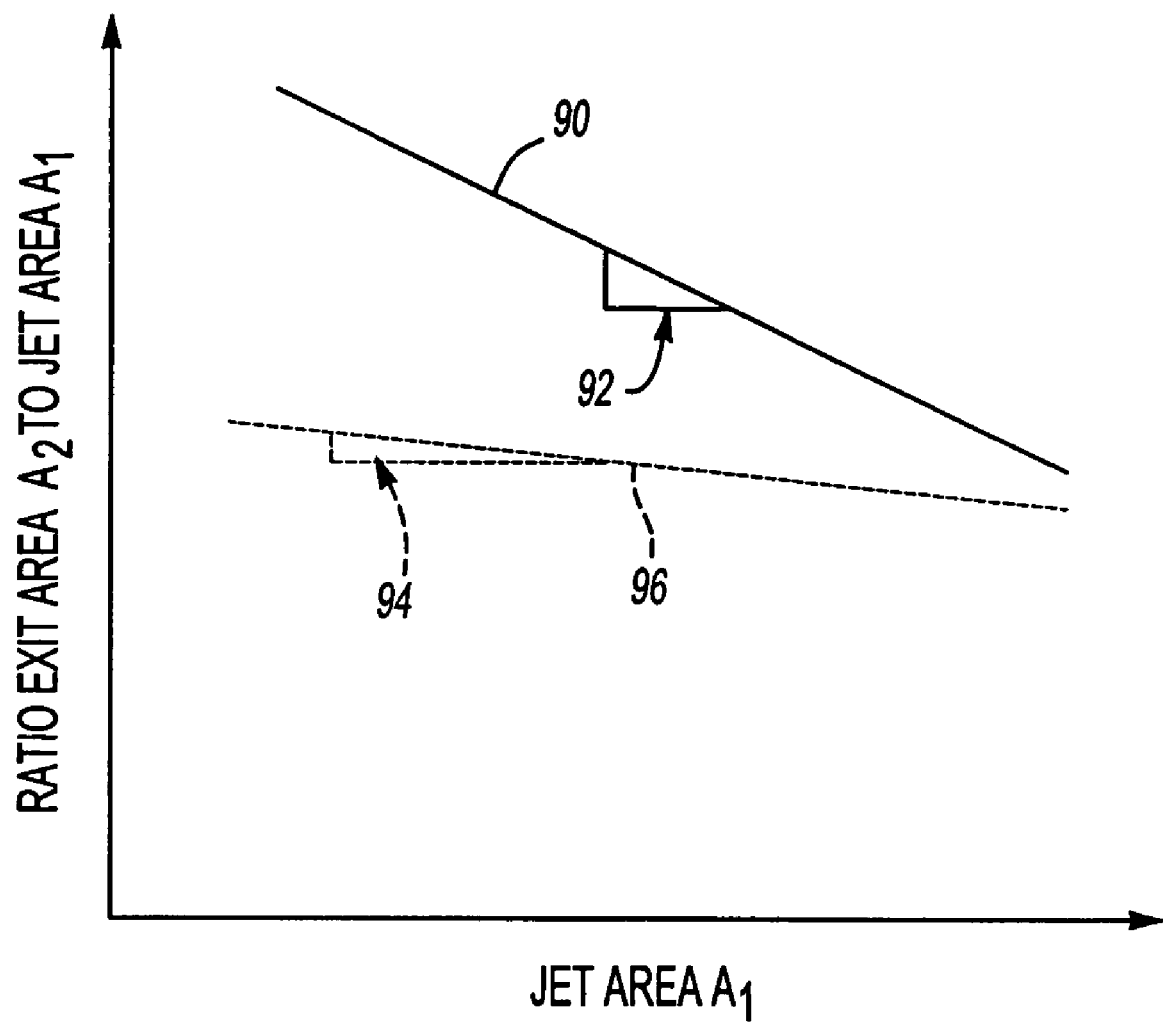
FIG. 5 is a graphic example of a benefit of using a curved slot according to the present invention.

FIG. 5 illustrates graphically one example of a benefit of utilizing a curved slot 64. In the illustration, line 90 for the curved slot 64 represents a plot of a ratio of the exit area $A_2$ to the jet area $A_1$ versus the jet area $A_1$ in a "high mode" wherein the exhaust pressures are relatively high. In this example, the line 90 includes a slope 92 that is significantly different than a slope 94 of a line 96 representing a previously known assembly having a linear slot. The larger slope 92 of the line 90 compared to the slope 94 of the line 96 (i.e., larger in absolute value terms but smaller in relative values) is the result of the larger range movement available using the curved slot 64 and corresponds to a greater advantage in engine efficiency compared to the previously known assemblies having linear slots.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A flap assembly for an exhaust nozzle arrangement comprising:
   a flap portion having a surface for directing exhaust gases;
   a support including a guide and a slider at least partially within the guide, the guide having a curved channel that defines a curved path of movement for the slider for establishing a range of possible movement of the flap assembly; and
   a link coupled with the slider and moveable relative to the curved channel, the link and the curved channel portion having an engagement angle between a longitudinal axis of the link and an axis of the curved channel portion taken tangent to a direction of movement within the curved channel portion at the location of the slider, and the engagement angle is greater than 90° when the slider is at an end of the curved channel portion, and an angle between the link and the flap portion is less than 5° when the slider is at the end of the curved channel portion.

2. The assembly as recited in claim 1, wherein the curved channel includes a curved opening having a closed periphery around the curved opening.

3. The assembly as recited in claim 1, including at least one fastener that secures the support and the surface together.

4. The assembly as recited in claim 1, wherein the surface and the support are made of different materials.

5. The assembly as recited in claim 4, wherein the surface is made of a nickel-based material and the support is made of a titanium-based material.

6. The assembly as recited in claim 1, wherein the curved channel includes a forward end and an aft end, and the aft end is nearer to the flap than the forward end.

7. The assembly as recited in claim 6, wherein the forward end corresponds to a first size of an exhaust exit area and the aft end corresponds to a second size that is greater than the first size.

8. The assembly as recited in claim 1, wherein the support includes a bracket portion having a shape that conforms to the surface, the bracket portion being secured to the surface, and a transverse surface extending from the bracket portion, the transverse surface defining the curved channel.

9. An aircraft engine nozzle assembly comprising:
   a flap portion moveable about a pivot for changing the size of an exhaust exit area;
   a bracket having a curved channel portion and a slider within the curved channel portion, and the curved channel portion defines a curved path of movement for the slider that establishes a range of possible movement of the flap portion; and
   a link coupled with the slider and moveable relative to the curved channel portion, one of the link or the bracket being moveable with the flap portion, the link and the curved channel portion having an engagement angle between a longitudinal axis of the link and an axis of the curved channel portion taken tangent to a direction of movement within the curved channel portion at the location of the slider, and the engagement angle is greater than 90° when the slider is at an end of the curved channel portion, and an angle between the link and the flap portion is less than 5° when the slider is at the end of the curved channel portion.

10. The assembly as recited in claim 9, wherein the bracket is secured to the flap portion for movement therewith.

11. The assembly as recited in claim 9, wherein the link includes a first end having the slider that is received in the curved channel portion and a second end that is connected to a static aircraft engine structure.

12. The assembly as recited in claim 9, including a second link that is coupled to the flap portion near the pivot and an actuator for moving the second link to move the flap portion about the pivot.

13. The assembly as recited in claim 9, wherein the bracket comprises a bracket portion and a surface that is transverse to the bracket portion, the surface including the curved channel portion, and the link comprises an elongated rod having the slider that is received in the curved channel portion.

14. The assembly as recited in claim 9, wherein the link has an associated force of movement when the link moves relative to the bracket, the force of movement including a first component in a direction of the curved channel portion and a second component that is perpendicular to the first component, and the ratio of the first component to the second component varies non-linearly along the curved channel portion.

15. The assembly as recited in claim 9, wherein the curved channel portion includes a magnitude of curvature that causes a magnitude of a component of force to vary non-linearly along a direction of the curved channel portion associated with relative movement between the link and the curved channel portion.

16. A method of adjusting a size of an exhaust exit area of an aircraft engine nozzle assembly, the nozzle assembly including an adjustable flap portion, the method comprising:
   receiving a slider that is connected to a link into a curved channel portion that is connected to a flap portion; and
   moving the slider within the curved channel portion that defines a curved path of movement for the slider to establish a range of possible movement of the flap portion, the link and the curved channel portion having an engagement angle between a longitudinal axis of the link and an axis of the curved channel portion taken tangent to a direction of movement within the curved channel portion at the location of the slider, and the engagement angle is greater than 90° when the slider is at an end of the curved channel portion, and an angle between the link and the flap portion is less than 5° when the slider is at the end of the curved channel portion.

17. The method as recited in claim 16, including changing a position of the slider along the curved channel portion to a forward end of the curved channel portion to establish a desired angle between the link and the flap portion.

18. The method as recited in claim 16, including changing a position the slider along the curved channel portion to the end of the curved channel portion to establish the angle of less than 5° between the link and the flap portion.

19. The method as recited in claim 16, including selectively changing a position of the slider along the curved channel portion towards a forward end of the curved channel portion to decrease an exhaust flow area and selectively changing the position of the slider toward an aft end of the curved channel to increase the exhaust flow area.

20. The assembly as recited in claim 1, wherein a direction of movement through the curved channel entirely along the curved path of movement is transverse to the surface for directing exhaust gases.

21. The assembly as recited in claim 1, wherein the curved channel is fixed relative to the surface for directing exhaust gases.

22. The assembly as recited in claim 1, wherein the end is an aft end of the curved channel.

* * * * *